(12) United States Patent
Fischer

(10) Patent No.: US 7,109,845 B2
(45) Date of Patent: Sep. 19, 2006

(54) CIRCUIT ARRANGEMENT FOR SIGNAL DETECTION HAVING CURRENT MIRROR WITH CASCODE COUPLED TRANSISTORS

(75) Inventor: Martin Fischer, Gleichen (DE)

(73) Assignee: Atmel Germany GmbH, Heilbronn (DE)

( * ) Notice: Subject to any disclaimer, the term of this patent is extended or adjusted under 35 U.S.C. 154(b) by 438 days.

(21) Appl. No.: 10/773,021

(22) Filed: Feb. 4, 2004

(65) Prior Publication Data

US 2004/0155753 A1    Aug. 12, 2004

(30) Foreign Application Priority Data

Feb. 11, 2003   (DE)   ................. 103 06 689

(51) Int. Cl.
  *H04B 1/10*  (2006.01)
(52) U.S. Cl. ................ 340/10.1; 455/299; 340/825.98; 327/330
(58) Field of Classification Search ................ 455/131, 455/292, 269, 299, 333, 336; 340/10.1, 825.98, 340/645; 327/66, 303, 330
  See application file for complete search history.

(56) References Cited

U.S. PATENT DOCUMENTS

| | | | | |
|---|---|---|---|---|
| 4,506,169 A | * | 3/1985 | Cole | ........................... 327/59 |
| 5,153,583 A | | 10/1992 | Murdoch | |
| 5,825,214 A | | 10/1998 | Klosa | |
| 5,889,489 A | * | 3/1999 | Friedman et al. | ............. 342/51 |
| 6,445,233 B1 | * | 9/2002 | Pinai et al. | .................. 327/159 |
| 6,469,913 B1 | * | 10/2002 | Hosotani et al. | .............. 363/16 |
| 6,664,770 B1 | * | 12/2003 | Bartels | ....................... 323/222 |
| 2002/0098818 A1 | * | 7/2002 | Yokogawa et al. | ......... 455/255 |
| 2004/0196097 A1 | * | 10/2004 | Miyagi | ....................... 329/347 |

FOREIGN PATENT DOCUMENTS

| | | |
|---|---|---|
| DE | 3854129 | 12/1995 |
| DE | 19537920 | 4/1997 |
| DE | 10012637 | 9/2001 |
| EP | 1026832 | 8/2000 |
| EP | 1134134 | 9/2001 |

OTHER PUBLICATIONS

D. A. Johns and K. Martin, "Analog Integrated Circuit Design", Chapter 6 "Advanced Current Mirrors and Opamps", section 6.1 "Advanced Current Mirrors", pp. 256 to 259, ISBN:0-471-14448-7.

* cited by examiner

*Primary Examiner*—Simon Nguyen
(74) *Attorney, Agent, or Firm*—W. F. Fasse; W. G. Fasse

(57) ABSTRACT

A circuit arrangement for detecting a received signal includes a rectifier with an input connected to a receiving antenna for rectifying an encoded received signal, a signal capacitor connected to an output of the rectifier, a discharge current sink connected to the signal capacitor, and a signal evaluating circuit connected to the signal capacitor. The discharge current sink includes a current mirror circuit of cascode-connected transistors. Thereby, the discharge current is substantially independent of the signal voltage over a larger range of voltages. This signal detection circuit is useful in transponders or remote sensors that receive and detect a signal transmitted by a base station.

14 Claims, 2 Drawing Sheets

CIRCUIT ARRANGEMENT FOR SIGNAL DETECTION HAVING CURRENT MIRROR WITH CASCODE COUPLED TRANSISTORS

PRIORITY CLAIM

This application is based on and claims the priority under 35 U.S.C. §119 of German Patent Application 103 06 689.6, filed on Feb. 11, 2003, the entire disclosure of which is incorporated herein by reference.

FIELD OF THE INVENTION

The invention relates to a circuit arrangement for receiving and detecting signals carried by an electromagnetic wave, e.g. in a passive or semi-passive transponder receiving a signal of an electromagnetic wave emitted by a base station.

BACKGROUND INFORMATION

Signal receiver circuits of the above mentioned general type are used, for example, in transponders for contactless identification systems such as radio frequency identification (RFID) systems, and for remote sensors, in order to receive and decode a coded signal that is transmitted from a base station or a reader device, and then to transform the decoded signal into a digital signal. For this purpose, such circuits typically include a rectifier that rectifies the signal received by an antenna of the transponder. A so-called signal capacitor is connected at the output of the rectifier. The signal voltage that represents the presently transmitted code prevails on the signal capacitor and is evaluated by an evaluating circuit connected thereto. In order that the signal voltage will follow a change or variation of the input voltage of the rectifier as quickly as possible, the signal capacitor has a defined discharge current applied thereto from a discharge current source or a discharge current sink. The discharge current has a magnitude adapted to the capacitance of the signal capacitor, while the capacitance is selected so that short time constants can be achieved and simultaneously a UHF decoupling is ensured.

Such a circuit arrangement with a discharge current sink, which comprises a current mirror circuit, is disclosed in the U.S. Pat. No. 5,889,489 (Friedman et al.), for example. The entire disclosure of U.S. Pat. No. 5,889,489 is incorporated herein by reference. In the known arrangement, the current mirror circuit is embodied as a so-called simple current mirror consisting of two n-FET transistors, in which a rated or desired current value in the form of a reference current, through one of the transistors, determines the current strength of the other transistor, that is to say the discharge current. Due to the characteristics of the MOS transistors used in such conventional current mirrors, the current strength is reduced sharply for signal voltages that are smaller than the transistor saturation voltage. Moreover, even for signal voltages above the transistor saturation voltage, there still exists a dependence between the discharge current and the signal voltage.

Current sources in the form of current mirror circuits, which have a small dependence between the current and the voltage, are utilized in operational amplifiers, for example. A so-called cascode current mirror circuit with a large output range, or so-called "wide-swing cascode current mirror" for an operational amplifier, which considerably reduces the dependence between the current and the voltage, is described in the article by D. A. Johns and K. Martin "Analog Integrated Circuit Design", pages 256 to 259, ISBN:0-471-14448-7.

SUMMARY OF THE INVENTION

In view of the above, it is an object of the invention to provide a circuit arrangement for signal detection of the above mentioned general type, which ensures a reliable signal detection, especially independent of the field strength of the signal-carrying electromagnetic field prevailing at the transponder. The invention further aims to avoid or overcome the disadvantages of the prior art, and to achieve additional advantages, as apparent from the present specification. The attainment of these objects is, however, not a required limitation of the invention.

The above objects have been achieved according to the invention in a circuit arrangement for signal detection, comprising a receiving antenna, a rectifier with an input connected to the antenna for rectifying an encoded received signal that is received by the antenna, a signal capacitor connected to an output of the rectifier, a discharge current sink having a current mirror circuit coupled with the signal capacitor, and a signal evaluating circuit coupled with the signal capacitor. Particularly according to the invention, the current mirror circuit of the discharge current sink comprises plural transistors connected to one another in a cascode arrangement.

In the circuit arrangement according to the invention, the current mirror circuit of the discharge current sink comprises transistors that are cascode coupled or circuit-connected in a cascode arrangement. With such a design or layout of the current mirror circuit, the internal resistance of the current sink increases sharply, whereby a substantially more ideal, i.e. flatter, current-voltage characteristic is achieved, especially for signal voltages above the transistor saturation voltage. This achieves a substantial independence of the discharge current from the signal voltage. Furthermore, such a circuit design or layout, in comparison to a simple current mirror, comprises fewer parasitic capacitances lying parallel to the signal capacitor.

In a further detailed embodiment of the circuit arrangement according to the invention, the cascode coupled transistors form a cascode current mirror circuit with a large output range. The possible signal range or signal swing is thus enlarged, whereby the operability of the detection circuit continuously over a large field strength range can be ensured. Furthermore, it is possible to select an advantageous, i.e. current saving, mirror ratio with a simultaneous minimum mirror error, without loading the signal capacitor with parasitic capacitances as for a simple current mirror.

In another embodiment of the circuit arrangement according to the invention, the signal capacitor is coupled with a further voltage limiter circuit. This prevents a possible malfunction or damage of the connected circuit components, and ensures that so-called signal "notches", which are provided in the signal as separators between two successive data bits, can be reliably detected and recognized even in connection with the high field strengths prevailing in the near field of the base station.

According to yet another embodiment detail of the circuit arrangement according to the invention, the voltage limiter circuit comprises series-connected diodes or a zener diode, connected parallel to the signal capacitor. Such circuit components may be integrated into the overall circuit in a simple and space-saving manner, and do not require any separate control logic for recognizing an over-voltage condition.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
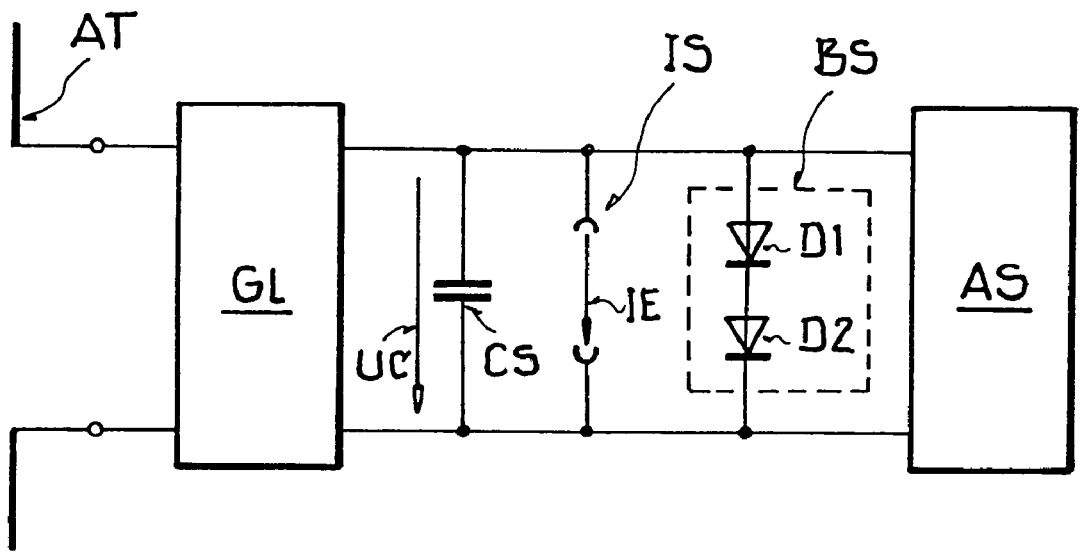
FIG. 1 is a schematic block circuit diagram of a circuit arrangement for signal detection according to the invention.

FIG. 1 is a schematic block circuit diagram of a circuit arrangement for signal detection according to the invention. The circuit arrangement includes an antenna AT, a rectifier GL having two input poles respectively connected to the poles of the antenna AT, a signal capacitor CS connected in circuit between the two output poles of the rectifier GL, a discharge current sink IS connected parallel to the signal capacitor CS, a voltage limiter circuit BS that is connected in parallel to the signal capacitor CS and the discharge current sink IS and that comprises two diodes D1 and D2 connected in series with one another between the two output poles of the rectifier GL, as well as a signal evaluating circuit AS that taps and evaluates the signal voltage UC prevailing on the signal capacitor CS so as to generate a digital signal in response to and dependent on the evaluation of the signal voltage UC. This signal evaluation, as well as most of the circuit components, can be embodied and carried out according to any conventionally known circuit components, arrangements, and functions of signal detector circuits. The term "connected", when describing the connection of various components to each other herein, means either directly connected (without intervening components) or indirectly connected (with intervening components), unless particularly specified.

The function or operation of the circuit arrangement shown as an example in FIG. 1 will be described in the following in connection with an example case in which an amplitude shift keying (ASK) modulation of the carrier signal is used as the modulation process. In this process, a logic "1" is represented by the presence of the carrier signal, and a logic "0" is represented by the complete suppression or omission of the carrier signal. However, the function or operation of the illustrated circuit is not limited to this particular example of the modulation process. To the contrary, any conventionally known modulation process could be used. The transmission and modulation of the carrier signal is carried out by any conventionally known base station, which is not shown.

When the carrier signal is present, a signal voltage UC will arise or be established at the output of the rectifier GL, that is to say on the signal capacitor CS, whereby this signal voltage UC corresponds to the field strength of the carrier signal. This signal voltage UC is applied to and evaluated by the evaluating circuit AS. If the signal voltage UC exceeds a threshold value within the evaluating circuit AS, then the evaluating circuit thereby recognizes a logic "1". On the other hand, when the carrier signal is switched off or suppressed by the base station, then the signal voltage UC drops because the signal capacitor CS is completely discharged by the discharge current IE flowing through the discharge current sink IS. Thereby, the evaluating circuit AS recognizes a logic "0".

Figure 2:
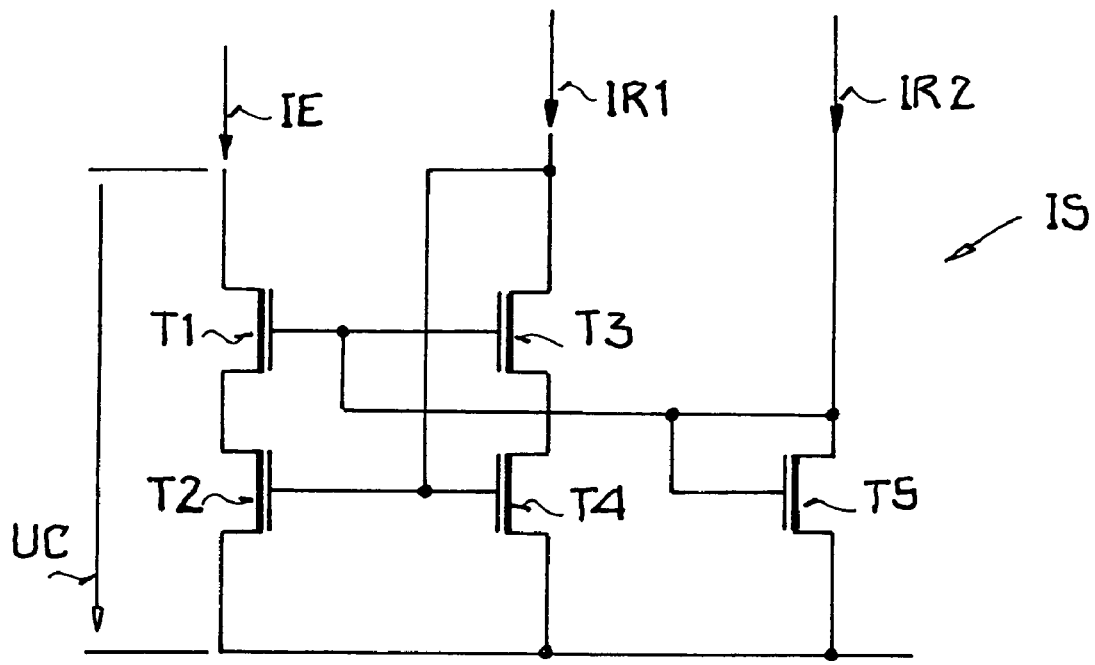
FIG. 2 is a schematic circuit diagram of a cascode current mirror circuit having a large output range and serving as a discharge current sink in the circuit according to FIG. 1.

The internal construction of the discharge current sink IS is shown in FIG. 2. Namely, the discharge current sink IS comprises five transistors T1, T2, T3, T4 and T5 (e.g. MOSFET transistors), which are circuit-connected with one another in such a manner so as to form a cascode current mirror circuit with a large output range. The particular circuit connection of the transistors T1 to T5 is clearly evident in the diagram of FIG. 2. With this circuit arrangement, the discharge current IE flowing through the transistors T1 and T2 is determined by the reference current IR1 flowing through the transistors T3 and T4 and the reference current IR2 flowing through the transistor T5 as well as by the transistor parameters of the several transistors. In this example, the two reference currents IR1 and IR2 are equal, and a mirror ratio of 1:10 has been selected. The so-called cascode transistor T1 has only a small or minimal influence on the mirror ratio, so that its channel width and its channel length can be selected to be small, so as to minimize the parasitic capacitances parallel to the signal capacitor that are caused by the transistor T1. Thereby, it is overall possible to keep the parasitic capacitances caused by the discharge current sink quite small while simultaneously achieving a mirror ratio that is advantageous with respect to the current consumption and further with a small mirror error.

Figure 3:
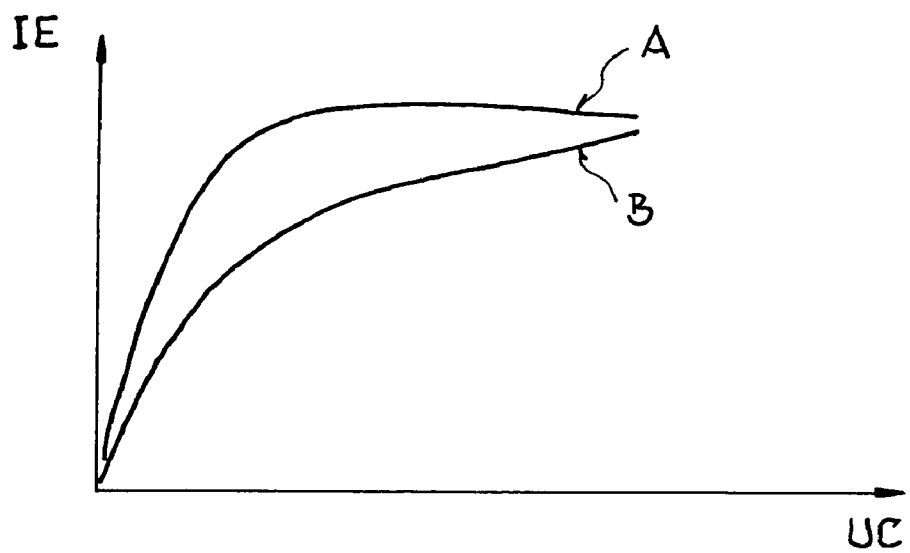
FIG. 3 is a diagram of current-voltage characteristics of the cascode current mirror circuit of FIG. 2 and of a simple current mirror, for comparison.

For the sake of comparison, FIG. 3 shows a diagram of the current-voltage characteristics of the cascode current mirror circuit according to FIG. 2 and of a simple current mirror with an identical mirror ratio of 1:10 respectively. The current-voltage characteristic curve A of the cascode current mirror circuit according to the invention has a significantly smaller or less pronounced voltage dependence of the current magnitude than the characteristic curve B of the simple or single current mirror circuit. In other words, the inventive characteristic curve A has a larger range of the signal voltage UC over which the discharge current IE remains substantially constant or flat and thus substantially independent of the voltage. Note that the substantially flat range of the curve A even exhibits a linear range of decreasing current for increasing voltage. Any change of the carrier field strength, e.g. caused by a change of the distance between the base station and the transponder, will lead to a corresponding change of the signal voltage UC. Such a change of the signal voltage UC will cause a change of the discharge current IE according to the characteristic curves A and B in FIG. 3. Namely, such a change of the signal voltage UC will cause a greater or more-pronounced change of the pulse durations determined in the transponder having a simple or single current mirror circuit in comparison to the transponder having the cascode current mirror circuit according to the invention, because the discharge current IE, which determines the discharge time, will change more sharply for a given voltage change in the conventional simple current mirror circuit than in the inventive cascode current mirror circuit. Such effects are reduced in the inventive cascode current mirror circuit, whereby a reliable recovery of the digital signal is ensured.

Figure 4:
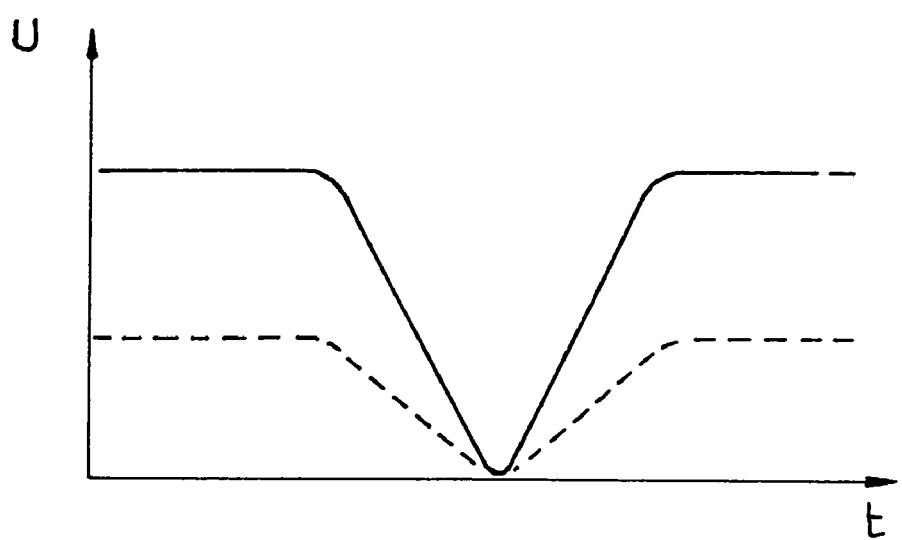
FIG. 4 is a diagram of an exemplary time progression of an input signal in the near field of a base station.

A further improvement of the operational security and reliability is achieved by the voltage limiter circuit BS. FIG. 4 is a diagram showing exemplary time progressions of an input signal on the rectifier GL of FIG. 1, shown with solid lines in the near field of the base station and shown with dashed lines in the far field of the base station. In order to insert a separator or "notch" between two successive data bits, the base station suppresses the carrier signal for a short time, resulting in the corresponding dip or notch in the voltage level U of the input signal as shown in FIG. 4. Particularly, due to the suppression of the carrier signal, the input signal voltage drops to zero volts and thereafter again rises to the voltage level corresponding to the received carrier field strength. This separator notch must be reliably detected and recognized in the transponder by the evaluating circuit.

Figure 5:
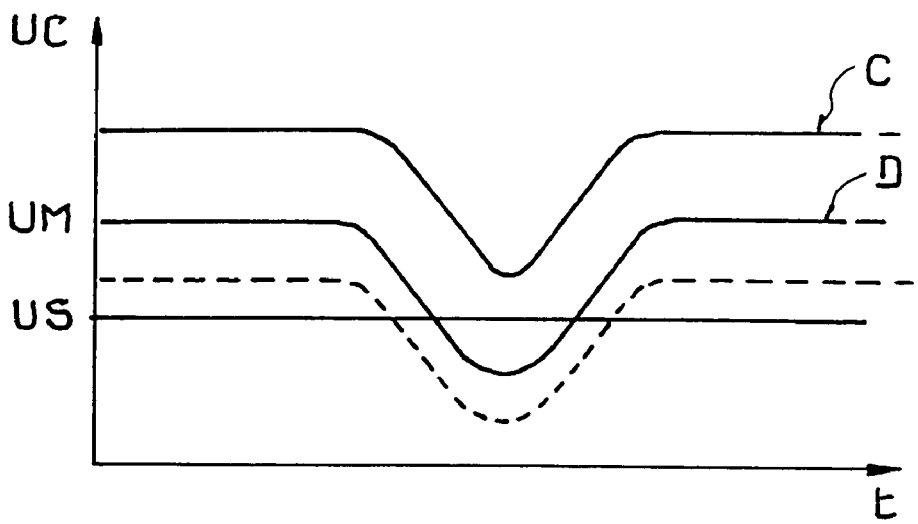
FIG. 5 is a diagram of exemplary time progressions of signal voltages upon receiving the input signal according to FIG. 4, respectively without and with a voltage limiter circuit.

FIG. 5 shows a diagram of the time progression of the signal voltage UC, which arises when the input signal with the time progression shown in FIG. 4 is received. In this regard, the voltage progression or curve C represents the course of the voltage without the voltage limiter circuit BS, and the voltage progression or curve D represents the voltage course with the voltage limiter circuit BS. The voltage progression or course in the far field is illustrated with a dashed line. When the signal voltage UC falls below a threshold voltage US of the evaluating circuit AS, then the evaluating circuit recognizes a logic "0", and otherwise recognizes a logic "1".

As can be seen from the voltage course C, the signal voltage UC in the near field does not fall below the threshold voltage US when the circuit arrangement is not provided with a voltage limiter circuit BS. This arises because the voltage drop during the omission or suppression of the carrier signal is not sufficient for the signal voltage UC to fall below the threshold voltage US, due to the relatively large voltage value of the signal voltage UC that prevails while the carrier signal is present. In other words, in view of the high voltage level of the received signal, the voltage does not drop sufficiently to fall below the voltage threshold US during the time of a separator notch in the received signal. Thus, the separator notch inserted in the signal by the base station is not detected and recognized by the evaluating circuit AS in the case of the voltage course C without the voltage limiter circuit BS.

On the other hand, when using the voltage limiter circuit BS, the signal voltage UC is limited to a maximum value UM as seen for the voltage course D. This is achieved because the two diodes D1 and D2 become conductive when the signal voltage UC exceeds the sum of the diodes' turn-on or forward conduction voltages. In this case, when the carrier signal is omitted or suppressed by the base station to provide a separator notch, the signal voltage UC drops below the threshold voltage US, since the voltage drop is sufficient in this case during the absence of the carrier signal, whereby the separator notch can be reliably detected and recognized by the evaluating circuit AS.

In the far field operation, as shown by the voltage course in dashed lines, the voltage limiter circuit BS does not have an influence, because its maximum voltage value or threshold UM is not exceeded by the signal voltage even when the full carrier signal is present in the far field.

The illustrated circuit arrangement makes it possible to achieve a reliable and interference-free signal detection in both the near field and the far field of the base station.

Furthermore, due to the provision of the voltage limiter circuit BS, a malfunction or damage of circuit components due to an excessively high field strength is prevented.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A circuit arrangement for detecting a received signal, comprising:
    a rectifier having an input adapted to have a received signal applied thereto and having an output adapted to provide a rectified signal;
    a signal capacitor connected to said output of said rectifier;
    a signal evaluating circuit connected to said signal capacitor; and
    a discharge current sink that is connected to said signal capacitor and that comprises a current mirror circuit comprising plural transistors circuit-connected with one another in a cascode arrangement.

2. The circuit arrangement according to claim 1, further comprising a receiving antenna connected to said input of said rectifier.

3. The circuit arrangement according to claim 1, wherein said transistors are MOSFET transistors.

4. The circuit arrangement according to claim 1, wherein said current mirror circuit includes a total of exactly five of said transistors.

5. The circuit arrangement according to claim 4, wherein said cascode arrangement of said five transistors includes a discharge current path having two of said transistors connected across said signal capacitor, a first reference current path having two of said transistors, and a second reference current path having one of said transistors.

6. The circuit arrangement according to claim 1, wherein said current mirror circuit is a cascode current mirror circuit having a wide-swing output.

7. The circuit arrangement according to claim 1, further comprising a voltage limiter circuit connected to said signal capacitor.

8. The circuit arrangement according to claim 7, wherein said voltage limiter circuit comprises series-connected diodes that are connected parallel to said signal capacitor.

9. The circuit arrangement according to claim 7, wherein said voltage limiter circuit comprises a zener diode connected parallel to said signal capacitor.

10. The circuit arrangement according to claim 7, wherein said output of said rectifier includes two output poles, and wherein said signal capacitor, said discharge current sink, said voltage limiter circuit, and said signal evaluating circuit are all connected parallel to each other between said two output poles of said rectifier.

11. The circuit arrangement according to claim 1, wherein said output of said rectifier includes two output poles, and wherein said signal capacitor, said discharge current sink and said signal evaluating circuit are all connected parallel to each other between said two output poles of said rectifier.

12. The circuit arrangement according to claim 1, wherein said discharge current sink exhibits a current-voltage characteristic having a linear range with decreasing current for increasing voltage.

13. The circuit arrangement according to claim 1, wherein said discharge current sink exhibits a current-voltage characteristic having a range in which a discharge current flowing through said discharge current sink is substantially independent of a signal voltage prevailing on said signal capacitor.

14. The circuit arrangement according to claim 1, integrated in a passive or semi-passive transponder.

* * * * *